United States Patent
Uragami et al.

(10) Patent No.: US 6,280,610 B1
(45) Date of Patent: Aug. 28, 2001

(54) HYDROTREATING CATALYST: COMPOSITION, PREPARATION, AND USE THEREOF

(75) Inventors: Yuji Uragami; Eiji Yamaguchi; Hideharu Yokozuka; Kikoo Uekusa, all of Ichikawa (JP)

(73) Assignee: Akzo Nobel NV (NL)

( * ) Notice: Subject to any disclaimer, the term of this patent is extended or adjusted under 35 U.S.C. 154(b) by 0 days.

(21) Appl. No.: 09/475,683

(22) Filed: Dec. 30, 1999

Related U.S. Application Data

(63) Continuation-in-part of application No. 08/973,374, filed as application No. PCT/IB96/00565 on Jun. 7, 1996, now abandoned.

(30) Foreign Application Priority Data

Jun. 8, 1995 (JP) .................................................. 7/166783

(51) Int. Cl.$^7$ .......................... C10G 45/04; B01J 31/00; B01J 23/00
(52) U.S. Cl. .................. 208/216 R; 208/216 PP; 208/217; 208/251 H; 208/254 H; 502/159; 502/172; 502/210; 502/211; 502/213; 502/313; 502/314; 502/315
(58) Field of Search ................... 502/159, 172, 210, 211, 213, 313, 314, 215; 208/216 R, 216 PP, 217, 251 H, 254 H

(56) References Cited

U.S. PATENT DOCUMENTS

| | | | |
|---|---|---|---|
| 4,012,340 | 3/1977 | Morimoto | 252/465 |
| 4,028,227 | 6/1977 | Gustafson | 208/216 |
| 4,051,021 | 9/1977 | Hamner | 208/216 |
| 4,062,809 | 12/1977 | Ward | 252/455 |
| 4,066,574 | 1/1978 | Tamm | 252/439 |
| 4,212,729 | 7/1980 | Hemsley et al. | 208/210 |
| 4,234,462 | * 11/1980 | Bondar et al. | 502/307 |
| 4,326,995 | 4/1982 | Berg et al. | 252/465 |
| 4,500,424 | 2/1985 | Simpson et al. | 208/216 |
| 4,530,917 | 7/1985 | Berrebi | 502/220 |
| 4,738,767 | 4/1988 | Ward | 208/111 |
| 5,032,565 | 7/1991 | Berrebi | 502/331 |
| 5,468,709 | * 11/1995 | Yamaguchi et al. | 502/210 |

FOREIGN PATENT DOCUMENTS

| | | | |
|---|---|---|---|
| 0 382 588 | 8/1990 | (EP) | B01J/37/16 |
| 0 469 675 | 2/1992 | (EP) | B01J/27/188 |
| 0 601 722 | 6/1994 | (EP) | C10G/45/08 |
| 1 504 586 | 3/1978 | (GB) | C10G/23/02 |
| 1995-136523 | 5/1995 | (JP) . | |

OTHER PUBLICATIONS

Translation of JP 1995–136523, May 1995.*
*International Search Report,* dated Oct. 7, 1996.
*Abstract,* JP 06210182, Aug. 2, 1994.
*Abstract,* JP 06339635, Dec. 13, 1994.
*Abstract,* JP 04166231, Jun. 12, 1992.
*Abstract,* JP 04166233, Jun. 12, 1992.

* cited by examiner

*Primary Examiner*—Walter D. Griffin
(74) *Attorney, Agent, or Firm*—Louis A. Morris

(57) ABSTRACT

The invention pertains to a process for activating a hydrotreating catalyst comprising a Group VIII hydrogenation metal and a Group VI hydrogenation metal, which are substantially in the oxide form, on a carrier in which the hydrotreating catalyst is contacted with an additive which is at least one compound selected from the group of compounds comprising at least two hydroxyl groups and 2–10 carbon atoms, and the (poly)ethers of these compounds, after which the catalyst is dried under such conditions that at least 50% of the additive remains in the catalyst. The additive is preferably at least one compound selected from ethylene glycol, diethylene glycol, and polyethylene glycol, or a saccharide or a polysaccharide. The invention additionally pertains to the catalyst obtainable by this process, which shows high activity in hydrodesulphurization and hydrodenitrogenation reactions, and to the use of the catalyst in hydrotreating.

13 Claims, No Drawings

US 6,280,610 B1

HYDROTREATING CATALYST: COMPOSITION, PREPARATION, AND USE THEREOF

Related U.S. Application

This application is a continuation-in-part of Ser. No. 08/973,374, filed Dec. 4, 1997, now abandoned which is a National Stage of PCT/IB96/00565 filed Jun. 7, 1996, incorporated herein by reference in its entirety.

BACKGROUND OF THE INVENTION

1. Field of the Invention

The invention relates to a catalyst composition suitable for hydrotreating, more particularly for hydrodesulphurisation and hydrodenitrogenation of hydrocarbon- containing feeds. The invention further relates to processes for the preparation and use of the catalyst composition.

2. Prior Art

In general, the object of catalytically hydrotreating hydrocarbon-containing feeds is the complete or partial removal of impurities. Common impurities are sulphur compounds and nitrogen compounds. The at least partial removal of such impurities from a feed will ensure that, when the final product is burnt, fewer sulphur oxides and/or nitrogen oxides harmful to the environment will be released. In addition, sulphur compounds and nitrogen compounds are toxic to many of the catalysts employed in the oil industry for converting feeds into ready-for-use products. Examples of such catalysts include cracking catalysts, hydrocracking catalysts, and reforming catalysts. It is therefore customary for feeds to be subjected to a catalytic hydrotreatment prior to their being processed in, say, a cracking unit. Catalytic hydrotreatment implies contacting a feed with hydrogen at elevated temperature and pressure in the presence of a hydrotreating catalyst. In this process the sulphur compounds and nitrogen compounds present in the feed are converted into readily removable hydrogen sulphide and ammonia.

In general, hydrotreating catalysts are composed of a carrier with deposited thereon a Group VI metal component and a Group VIII metal component. The most commonly employed Group VI metals are molybdenum and tungsten, while cobalt and nickel are the conventional Group VIII metals. Phosphorus may also be present in the catalyst. The prior art processes for preparing these catalysts are characterised in that a carrier material is composited with hydrogenation metal components, for example by impregnation, after which the composite is calcined to convert the metal components into their oxides. Before being used in hydrotreating, the catalysts are generally presulfided to convert the hydrogenation metals into their sulphides.

Because the requirements as to the legally permitted sulphur and nitrogen contents in fuels are becoming ever stricter, there is a continuous need for hydrotreating catalysts with improved activity. Further, at a given final sulphur content a more active catalyst will make it possible to operate under milder process conditions (energy saving) or to increase the life span of a catalyst between regenerations (cycle length).

Various efforts have been made in the art to provide hydrotreating catalysts with improved activity. A relatively new trend in this field is the use of additives. For example, Japanese patent application 04-166231 discloses a process for preparing a hydrotreating catalyst in which a support is impregnated with an impregnation solution comprising a Group VI metal component, a Group VIII metal component, and optionally a phosphorus component. The support is dried at a temperature of less than 200° C., contacted with a polyol, and then dried again at a temperature below 200° C. Japanese patent application 04-166233 discloses substantially the same process as the above-mentioned patent application, except that instead of a polyol an alkoxycarboxylic acid is used.

Japanese Laid -Open No. 1995-136523 teaches "burning" a support that has been impregnated with a solution of hydrogenation metal components at temperatures ranging from 200 to 400 ° C., followed by impregnation with an organic acid or polyhydric alcohol and then dried. This reference requires that the catalyst prior to the second impregnation not be a "conventional" catalyst. Thus, the catalyst of this reference prior to impregnation with an organic acid or polyhydric alcohol is prepared in a manner different than what is employed in making a conventional catalyst, whether the difference lies in the burning temperature or in the time of burning or in the combination of temperature and time.

Japanese patent application 06-339635 discloses a process in which a support is impregnated with an impregnation solution comprising an organic acid, Group VI and Group VIII hydrogenation metal components, and preferably a phosphorus component. The impregnated support is dried at a temperature below 200° C. The dried impregnated support is contacted with an organic acid or polyol, after which the thus treated support is dried at a temperature below 200° C.

Japanese patent application 06-210182 discloses a process for preparing a catalyst in which a boria-alumina support comprising 3–15 wt. % of boria is impregnated with an impregnation solution comprising a Group VI metal component, a Group VIII metal component, and a polyol. The impregnated support is dried at a temperature of 110° C. to form a catalyst.

European patent application 0 601 722 describes a process for preparing a catalyst in which a gamma-alumina support is impregnated with an impregnation solution comprising a Group VI metal component, a Group VIII metal component, phosphoric acid, water, and diethylene glycol. The impregnated support is dried at a temperature of 100° C. The catalysts are presulfided with a Kuwait straight-run gas oil containing 1.15 wt. % of sulphur and 3% butane thiol.

Although the above catalysts do indeed show improved hydrotreating activity as compared with conventional hydrotreating catalysts which do not contain an additive, this improved activity will only appear when the catalyst is used for the first time. Regeneration of the catalyst by burning off coke results in removal of the additive from the catalyst, so that the improvement in activity is lost in the further catalyst life cycles.

U.S. Pat. No. 4,530,917 describes a process in which a conventional hydrotreating catalyst is contacted with an additive, but in this patent the additive is present in a presulfiding solution which contains a polysulfide as sulfiding agent.

U.S. Pat. No. 5,032,565 describes a process for reducing catalysts comprising a Group VIII metal by contacting them with a reducing agent which may be an alcohol or polyalcohol. It is expressly stated that this process is applicable to catalysts which normally are not sulfided because sulphur is a poison to this type of catalyst

SUMMARY OF THE INVENTION

In one embodiment the present invention is a process for activating a conventional hydrotreating catalyst comprising hydrogentation metal components on a carrier comprising one or more Group VIII hydrogenation metals substantially in the oxide form and one or more Group VI hydrogenation metals substantially in the oxide form. The conventional hydrotreating catalyst is contacted with an additive which is at least one compound selected from the group of compounds comprising at least two hydroxyl groups and 2–10 carbon atoms, and the ethers and polyethers of these compounds. The catalyst is then dried under such conditions that at least 50% of the additive remains in the catalyst.

In a second embodiment the present invention is a hydrotreating catalyst prepared in accordance with the process of the above first embodiment.

In yet another embodiment, the present invention is a process for hydrotreating a hydrocarbon feed wherein such feed is contacted under hydrotreating conditions with the above hydrotreating catalyst.

Other embodiments of the invention encompass details about catalyst compositions and process conditions, all of which are hereinafter disclosed in the following discussion of each of the facets of the present invention.

DETAILED DESCRIPTION OF THE INVENTION

The present invention relates to a process for preparing a hydrotreating catalyst which is also suitable for activating hydrotreating catalysts which were either prepared in a conventional manner without the use of an additive, or from which the additive was removed by regeneration. The hydrotreating catalyst used as starting material in the process according to the invention may thus be a conventional hydrotreating catalyst prepared by a process in which hydrogenation metal components are composited with a carrier, after which the composite material is subjected to a calcination step to convert the hydrogenation metal components into their oxides. However, the hydrotreating catalyst used as starting material may also be a used hydrotreating catalyst from which the additive, if there was one, was removed by regeneration after the catalyst's first use.

By contrast with U.S. Pat. No. 4,530,917 discussed above, in the process according to the invention the impregnation solution does not contain a sulfiding agent. Further, it was found that the catalyst prepared by the process according to the invention has such high activity that presulfiding can often be dispensed with.

By contrast with U.S. Pat. No. 5,032,565 discussed above, the catalysts of the present invention are of the type which is not poisoned by sulphur compounds and is often sulfided before or during use.

As has been explained earlier, before conventional hydrotreating catalysts are used in the hydrotreating of hydrocarbon feeds, they are generally subjected to a sulfidation treatment to convert the metal oxides into metal sulphides. This sulfidation treatment can be carried out by contacting the catalyst with hydrogen sulphide at elevated temperature and pressure, with elemental sulphur, or with an organic sulphur compound such as a polysulfide. It is also possible to sulphide the catalyst by contacting it with a hydrocarbon feed to which additional sulphur compounds have been added (spiked hydrocarbon feed). Needless to say, it would be a major advantage if a catalyst were available which would have high activity without requiring a presulfidation step with a separate presulfiding agent or a spiked feed. It has now been found that the catalyst according to the invention shows such high activity. For the catalyst according to the invention it is sufficient to be contacted with the feed to be hydrotreated if said feed contains at least 0.2 wt. % of sulphur. This makes it possible to use the catalyst according to the invention without a separate sulfiding step using additional sulphur compounds being necessary, even if the sulphur content of the feed is as low as 0.2 wt. %. Accordingly, the present invention also relates to a process for hydrotreating a hydrocarbon feed in which a hydrocarbon feed which contains at least 0.2 wt. % of sulphur is contacted under conditions of elevated temperature and pressure with a hydrotreating catalyst comprising a Group VIII metal oxide and a Group VI metal oxide on a carrier, which catalyst additionally comprises an additive which is at least one compound selected from the group of compounds comprising at least two hydroxyl groups and 2–10 carbon atoms, and the (poly)ethers of these compounds, wherein the Group VIII metal compound and the Group VI metal compound are in the form of oxides.

The catalyst according to the invention is prepared as follows:

The starting material is a conventional hydrotreating catalyst comprising a Group VIII metal oxide component and a Group VI metal oxide component on a carrier. As Group VI metals may be mentioned molybdenum, tungsten, and chromium. Group VIII metals includes nickel, cobalt, and iron. Especially preferred in this connection is a combination of nickel and/or cobalt and molybdenum and/or tungsten. If the hydrodesulphurisation activity of the catalyst is the more important, a combination of cobalt and molybdenum is advantageous. If the hydrodenitrogenation activity of the catalyst is the more important, a combination of nickel and molybdenum or tungsten is advantageous. The catalyst usually has a metal content in the range of 0,1 to 50 wt. %, calculated on the overall weight of the catalyst. The Group VI and Group VIII metals will frequently be present in amounts of 5–30 wt. % and 1–10 wt. %, respectively, calculated as trioxide and monoxide, respectively, the two amounts being calculated on the overall weight of the catalyst. If so desired, the catalyst may also contain other components, such as phosphorus, halogens, and borium. Particularly, the presence of phosphorus in an amount of 1–10 wt. %, calculated as $P_2O_5$, to improve the hydrodenitrogenation activity of the catalyst is be preferred.

The catalyst carrier may be composed of the conventional oxides, e.g., alumina, silica, silica-alumina, alumina with silica-alumina dispersed therein, silica-coated alumina, magnesia, zirconia, boria, and titania, as well as mixtures of these oxides. As a rule, preference is given to the carrier being of alumina, silica-alumina, alumina with silica-alumina dispersed therein, or silica-coated alumina. Special preference is given to alumina and alumina containing up to 10 wt. % of silica. A carrier containing a transition alumina, for example an eta, theta, or gamma alumina is preferred within this group, wherein a gamma-alumina carrier is most especially preferred.

The catalyst's pore volume (measured via mercury penetration) is not critical to the process according to the invention and will generally be in the range of 0,5 to 1 ml/g. The specific surface area is not critical to the process according to the invention either and will generally be in the range of 50 to 400 $m^2/g$ (measured using the BET method). Preferably, the catalyst will have a median pore diameter in the range of 7–15 nm, as determined by mercury porosimetry, and at least 60% of the total pore volume will be in the range of $\leq 2$ nm from the median pore diameter.

The catalyst is employed in the conventional manner in the form of spheres or extrudates. Examples of suitable types of extrudates have been disclosed in the literature (see, int. al., U.S. Pat. No. 4,028,227). Highly suitable for use are cylindrical particles (which may be hollow or not) as well as symmetrical and asymmetrical polylobed particles (2, 3 or 4 lobes).

The conventional hydrotreating catalysts suitable for use in the process according to the invention may be obtained, e.g., as follows. A carrier precursor is prepared, e.g., in the case of alumina, in the form of an alumina hydrogel (boehmite). After it has been dried or not, e.g., by means of spray-drying, it is shaped into particles, for example by extrusion. The shaped particles are calcined at a temperature in the range of 400° to 850° C., resulting, in the case of alumina, in a carrier containing a transition alumina, e.g., a gamma, theta, or eta-alumina. Then, suitable amounts of precursors for the hydrogenation metals and the optional other components, such as phosphorus, are deposited on the catalyst, for example in the form of an aqueous solution. In the case of Group VI metals and Group VIII metals, the precursors may be ammonium molybdate, ammonium tungstenate, cobalt nitrate and/or nickel nitrate. Suitable phosphorus component precursors include phosphoric acid and the various ammonium hydrogen phosphates. After an optional drying step at a temperature in the range of 25°–200° C., the resulting material is calcined at a temperature in the range of 350°–750° C. to convert the metal component precursors, and the optional other component precursors to form components that are substantially in the oxide form.

The term "substantially in the oxide form" with regard to metal components is intended to mean 100% oxides or close enough to 100% oxides so as not to materially affect the character or nature of the catalyst.

It would be clear to one of ordinary skill in the art that there can be a wide number of variations on this method. Thus, it is possible to apply a plurality of impregnating steps, the impregnating solutions to be used containing one or more of the component precursors that are to be deposited, or a portion thereof. Instead of impregnating techniques there can be used dipping methods, spraying methods, etc. With multiple impregnation, dipping, etc. drying and/or calcining may be carried out in between. Alternatively, one or more component precursors can be mixed wholly or in part with the carrier prior to the shaping step being carried out. In such an embodiment the component precursor material, or a portion thereof, can be deposited on the not yet shaped carrier material, say, a powder, by means of, e.g., impregnation, after which the shaping step is carried out. Alternatively, it is possible to intimately mix one or more component precursors wholly or in part with the carrier material during the shaping step rather than prior to it. Techniques that are suitable for this process are co-pelletization and co-extrusion. It is recommended that the group VIB metal component precursor employed in this process be molybdenum trioxide.

Conventional hydrotreating catalysts and the processes for preparing them are described in, e.g., U.S. Pat. Nos. 4,738,767, 4,062, 809, 4,500,424, GB 1,504,586, U.S. Pat. Nos. 4,212 729, 4,326,995, 4,051,021, 4,066,574, EP-A 0 469 675.

As stated before, the process according to the invention includes both the activation of fresh hydrotreating catalyst prepared for the process, and the activation of hydrotreating catalyst which has been used and regenerated.

The conventional hydrotreating catalyst used as starting material is impregnated with an impregnation solution comprising the selected additive in an appropriate solvent. The solvent used in preparing the additive impregnation solution generally is water, although other compounds, such as methanol, ethanol, and other alcohols may also be suitable, depending on the nature of the additive.

The additive to be used in preparing the catalyst according to the invention is selected from the group of compounds comprising at least two hydroxyl groups and 2-10 carbon atoms per molecule, and the (poly)ethers of these compounds. It is possible to use a single compound or a combination of compounds. Suitable compounds for use in the process according to the invention include aliphatic alcohols such as ethylene glycol, propylene glycol, glycerin, trimethylol ethane, trimethylol propane, etc. Ethers of these compounds include diethylene glycol, dipropylene glycol, trimethylene glycol, triethylene glycol, tributylene glycol, tetraethylene glycol, tetrapentylene glycol. This range can be extrapolated to include polyethers like polyethylene glycol. For this last compound, polyethylene glycol with a molecular weight between 200 and 600 is preferred. Other ethers which are suitable for use in the present invention include ethylene glycol monobutyl ether, diethylene glycol monomethyl ether, diethylene glycol monoethyl ether, diethylene glycol monopropyl ether, and diethylene glycol monobutyl ether. Another group of compounds comprising at least two hydroxyl groups and 2–10 carbon atoms per molecule are the saccharides. Preferred saccharides include monosaccharides such as glucose and fructose. Ethers thereof include disaccharides such as lactose, maltose, and saccharose. Polyethers of these compounds include the polysaccharides.

The amount of additive to be used depends on the specific situation. An important factor in deciding both the suitability of the additive as such and the amount of additive to be used is the viscosity of the impregnation solution containing the additive. In order for the process according to the invention to be a success, the additive must be distributed homogeneously over the catalyst. This is suitably effected by impregnating the catalyst with an impregnation solution comprising the additive in a solvent, with the total volume of the impregnation solution being in the range of the total pore volume of the catalyst to be impregnated.

In this technique, which is known in the art as pore volume impregnation, the impregnation solution will be taken up virtually completely by the pores of the catalyst, which makes for an efficient use of chemicals. If the impregnation solution is too viscous, the impregnation step will not result in a homogeneous distribution of the additive over the catalyst.

It was found that the appropriate amount of additive generally lies in the range of 0.01–2.5 moles of additive per mole of hydrogenation metals present in the catalyst. If the amount of additive added is too low, the advantageous effect of the present invention will not be obtained. On the other hand, the addition of an exceptionally large amount of additive will not improve the effect of the present invention. On the contrary, besides being a waste of material, the addition of more additive than necessary results in a large quantity of organic materials being present in the catalyst, which may lead to detrimental coke formation when the catalyst is used. Further, as has been explained before, the use of a large quantity of additive may increase the viscosity of the impregnation solution to an unacceptable value. As will be clear to the person skilled in the art, the exact amount of additive to be used in a specific situation, and the upper and lower limits for these ranges, will depend upon a variety of parameters including the metals content of the catalyst, the pore volume and pore size distribution of the catalyst, the nature of the additive, the solvent to be used in the impregnation solution, the impregnation conditions, etc. It is well within the scope of the person skilled in the art to determine the optimum amount of additive to be used in each specific situation, taking the above-mentioned variables into account.

The viscosity of the additive at room temperature may give some indication of the amount of additive which may suitably be used in the process according to the invention, with the general trend being the more viscous the additive, the less of it can be incorporated into the catalyst. The following Table gives the viscosity at room temperature, the generally preferred range, and the more preferred range for various additives which may be used in the process according to the invention.

| Additive | Viscosity (20° C.) cps | Amount (mole/mole) General | Amount (mole/mole) Preferred |
| --- | --- | --- | --- |
| Ethylene glycol monobutyl ether | 3 | 0.01–2.5 | 0.05–1.5 |
| diethylene glycol monomethyl ether | 4 | 0.01–2.5 | 0.05–1.5 |
| diethylene glycol monoethyl ether | 4 | 0.01–2.5 | 0.05–1.5 |
| diethylene glycol monopropyl ether | 5 | 0.01–2.5 | 0.05–1.5 |
| diethylene glycol monobutyl ether | 6 | 0.01–2.5 | 0.05–1.5 |
| ethylene glycol | 21 | 0.01–2.5 | 0.05–1.5 |
| propylene glycol | 56 | 0.01–2.0 | 0.05–1.0 |
| diethylene glycol | 38 | 0.01–2.0 | 0.05–1.0 |
| trimethylene glycol | 56 | 0.01–2.0 | 0.05–1.0 |
| triethylene glycol | 48 | 0.01–2.0 | 0.05–1.0 |
| tetraethylene glycol | 58 | 0.01–2.0 | 0.05–1.0 |
| polyethylene glycol (MW200) | 61 | 0.01–2.0 | 0.05–1.0 |
| polyethylene glycol (MW400) | 100 | 0.01–1.5 | 0.05–0.8 |
| polyethylene glycol (MW600) | 140 | 0.01–1.5 | 0.05–0.8 |
| glycerin | 1500 | 0.01–1.5 | 0.05–0.8 |
| trimethylol ethane | solid | 0.01–1.5 | 0.05–0.5 |
| trimethylol propane | solid | 0.01–1.5 | 0.05–0.5 |
| glucose | solid | 0.01–1.5 | 0.05–0.5 |
| fructose | solid | 0.01–1.5 | 0.05–0.5 |
| maltose | solid | 0.01–1.5 | 0.05–0.5 |
| lactose | solid | 0.01–1.5 | 0.05–0.5 |
| saccharose | solid | 0.01–1.5 | 0.05–0.5 |

The impregnation step, which is generally carried out according to the pore volume impregnation technique described before, merely comprises adding the impregnation solution to the catalyst particles and homogenising the mixture until virtually all of the impregnation solution is taken up into the catalyst. The technique of impregnation is well-known to the person skilled in the art of hydrotreating catalysts. After the impregnation step has been completed, the catalyst is dried to remove the solvent. It is essential to the process according to the invention that the drying step is effected in such a manner that the additive remains in the catalyst and is not removed by evaporation or decomposition. In consequence, the drying conditions to be applied depend heavily on the temperature at which the specific additive boils or decomposes. In the context of the present invention, the drying step should be carried out under such conditions that at least 50%, preferably 70%, more preferably 90% of the additive which was incorporated into the catalyst in the impregnation step is still present in the catalyst after the drying step. Of course, it is preferred to keep as much additive as possible in the catalyst during the drying step, but with the more volatile additives additive evaporation during the drying step cannot always be avoided. The drying step may, e.g., be carried out in air, under vacuum, or in inert gas. Generally, it is advantageous to have a drying temperature below 220V C., although a lower temperature may be necessary, depending on the nature of the additive.

It is not altogether clear what causes the surprisingly high hydrotreating activity of the hydrotreating catalyst according to the invention. It may be that the improvement in activity is caused by the fact that the additive somehow prevents aggregation of the metal compound during the sulphide formation, which leads both to an easy sulfidation without the necessity of adding additional sulphur components and to a high activity. It has been found that it is preferred for the catalyst according to the invention to show a peak in its X-ray diffraction pattern at $2\Theta=6-8°$. It appears that catalysts according to the invention which show this peak are more active than catalysts according to the invention which do not show this peak.

The dried additive-containing hydrotreating catalyst may be subjected to a sulfiding step before it is used in the hydrotreating of hydrocarbon feeds, but, as has been explained before, this is not necessary. If it is decided to sulphide the catalyst before use, this can be done in one of the ways known in the art. For example, it is possible to contact the catalyst with inorganic or organic sulphur compounds, such as hydrogen sulphide, elemental sulphur, or organic polysulfides, or to sulfide the catalyst by contacting it with a hydrocarbon feed to which a sulfur compound has been added. All of this will be known to the skilled person as catalyst sulfiding or presulfiding.

The present catalysts can be used in the hydrotreating of a wide range of feeds. Examples of suitable feeds include middle distillates, kero, naphtha, vacuum gas oils, and heavy gas oils.

The conventional process conditions, such as temperatures in the range of 250°–450° C., pressures in the range of 5–250 bar, space velocities in the range of 0,1–10 h−1, and H2/oil ratios in the range of 50–2000 Nl/l, can be applied here.

EXAMPLES

Example 1

Preparation of a Hydrodesulphurisation Catalyst Using Ethylene Glycol

Comparative catalyst A, which is to be used as starting material, is prepared as follows. One kilogram of gamma-alumina extrudates is impregnated with an aqueous impregnation solution containing suitable amounts of molybdenum trioxide, cobalt carbonate, and phosphoric acid. The impregnated extrudates are dried for 16 hours at 100° C., after which the dried extrudates are calcined for three hours at 400° C. in the air. The thus obtained catalyst contained 22 wt. % of molybdenum, calculated as trioxide, 3 wt. % of cobalt, calculated as oxide, and 4 wt. % of phosphorus, calculated as P2O5.

Various catalysts according to the invention were prepared by impregnating Comparative catalyst A to pore volume saturation with an impregnation solution comprising an appropriate amount of ethylene glycol mixed in water, to obtain the amount of ethylene glycol in the catalyst composition given in Table 2. The catalysts were then dried under the conditions given in Table 2.

In the Examples of the present specification the various catalysts according to the invention will be indicated by codes consisting of two letters and a numeral. The first letter stands for the catalyst used as starting material. The second letter is intended to identify the additive used. The numeral indicates the number of the Experiment within a certain series.

Comparative catalysts which do not contain any additive are indicated with the letter indicating the starting material, followed by the number of the treatment and a C in parentheses to indicate that it is a comparative example. Comparative catalysts which do contain additive but which are otherwise not according to the invention are indicated with a letter indicating the starting catalyst, a letter indicating the additive, and a numeral indicating the number of the experiment, followed by a C in parentheses. The starting comparative catalyst A is indicated as A(C).

Comparative catalyst A1 (C) was prepared by impregnating Comparative catalyst A to pore volume saturation with water, and then drying the resulting product for 16 hours at 100° C.

Comparative Catalyst A2(C) was prepared by sulfiding Comparative catalyst A with TNPS, as is described in Japanese patent publication No. H-4 79701.

Comparative catalyst AA1 (C) was prepared by subjecting a catalyst with the same composition as Catalyst AA2 to a calcination step.

Comparative catalyst AA2(C) was prepared by a process in which a too large amount of additive was used as compared with the amount of metal present. The presence of a too large amount of additive will cause plugging of the catalyst pores with additive, detrimentally affecting activity.

Comparative catalyst AA3(C) was prepared by a process in which the catalyst is dried at a temperature which is so high that at least a substantial part of the additive decomposes or evaporates.

The X-ray diffraction pattern of the various catalysts was determined using a Rotaflex RAD-rVB made by Rigaku Electric Co. Ltd., using a copper X-ray diffraction vessel with a vessel voltage of 40kV, at 150 mA, with a divergence slit of 1° and a light emission slit of 0.3 mm.

In Table 2 it is indicated which of the catalysts show a peak in the X-ray diffraction pattern at 2☉=6–8°.

To be tested, 15 ml of each catalyst was brought into a continuous reactor and tested using two kinds of feeds: Feed A: Kuwait straight-run light gas oil (LGO) containing 1.15 wt. % of sulphur and 68 ppm of nitrogen Feed B: Feed A to which 3% butane diol had been added.

First, each catalyst was presulfided under the conditions given below, with the presulfiding being directly followed by catalyst testing.

TABLE 1

Presulfiding and test conditions

|  | Presulfiding | Testing |
| --- | --- | --- |
| Temperature (° C.) | 316 | 330 |
| H2 pressure (kg/cm2) | 20 | 30 |
| LHSV (hr-1) | 1 | 2 |
| H2/feed ratio (Nl/l) | 200 | 300 |
| Time (hours) | 18 | 168 |

The relative volume activities for the various catalysts were determined as follows. For each catalyst the reaction constant kn was calculated from the following formula:

$$k_n = LHSV \times 1/(n-1) \times (1/S^{n-1} \times 1/S_0^{n-1})$$

in which the S stands for the percentage of sulphur in the product, S0 stands for the percentage of sulphur in the feed, and n stands for the reaction order of the hydrodesulphurisation reaction. In the present experiments, n has the value 1.75. The reaction constant of Comparative catalyst A was set at 100, and the reaction constants of the other catalysts were recalculated to obtain the relative volume activities. The results for both feed A and feed B are given in Table 2. The percentage of sulphur present in the feed and in the product was determined using an SLFA-920 of Horiba Manufacturing Co., Ltd.

TABLE 2

| | | Drying | | Calcining | | | Activity | |
| --- | --- | --- | --- | --- | --- | --- | --- | --- |
| | Additive | T | t | T | t | | | |
| Catalyst | (mole/mole) | (° C.) | (hr) | (° C.) | (hr) | X-ray | A | B |
| AA1 | 0.05 | 100 | 16 | – | – | + | 167 | 168 |
| AA2 | 0.25 | 100 | 16 | – | – | + | 168 | 171 |
| AA3 | 1.00 | 100 | 16 | – | – | + | 172 | 175 |
| A(C) | – | – | – | – | – | – | 100 | 126 |
| A1(C) | 0 | 100 | 16 | – | – | + | 98 | 122 |
| A2(C) | – | – | – | – | – | – | 123 | 127 |
| AA1(C) | 0.25 | 100 | 16 | 500 | 4 | – | 101 | 128 |
| AA2(C) | 3.00 | 100 | 16 | – | – | + | 98 | 125 |
| AA3(C) | 0.25 | 300 | 16 | – | – | + | 108 | 128 |

From Table 2 it is clear that the catalysts according to the invention show a higher activity than the ones which are not according to the invention. The catalyst according to the invention which is not subjected to a separate sulfiding step appears to show a higher activity even than the sulfided conventional catalyst A2(C)

Example 2

Preparation of a Hydrodesulphurisation Catalyst Using Diethylene Glycol Monoethyl Ether Further catalysts according to the invention and comparative catalysts were prepared using diethylene glycol monoethyl ether as additive. Again, the additive was mixed with appropriate amounts of water to impregnate the catalyst by way of pore volume impregnation.

The catalysts were presulfided and tested in the manner described in Example 1. Catalyst composition and test results are summarised in Table 3.

TABLE 3

| | | Drying | | Calcining | | | Activity | |
| --- | --- | --- | --- | --- | --- | --- | --- | --- |
| | Additive | T | t | T | t | | | |
| Catalyst | (mole/mole) | (° C.) | (hr) | (° C.) | (hr) | X-ray | A | B |
| AB1 | 0.05 | 100 | 16 | – | – | + | 161 | 165 |
| AB2 | 0.25 | 100 | 16 | – | – | + | 156 | 161 |
| AB3 | 1.00 | 100 | 16 | – | – | + | 161 | 165 |
| A(C) | – | – | – | – | – | – | 100 | 126 |
| A1(C) | 0 | 100 | 16 | – | – | + | 98 | 122 |
| A3(C) | – | – | – | – | – | – | 123 | 127 |
| AB1(C) | 0.25 | 100 | 16 | 500 | 4 | – | 97 | 124 |
| AB2(C) | 3.00 | 100 | 16 | – | – | + | 96 | 124 |
| AB3(C) | 0.25 | 300 | 16 | – | – | + | 110 | 127 |

Again, the catalysts according to the invention show a much higher activity than the comparative catalysts in the hydrodesulphurisation of both Feed A and Feed B. Example 3

Preparation of a Hydrodesulphurisation Catalyst Using Polyethylene Glycol (MW200)

Example 1 was repeated, except that a polyethylene glycol with an average molecular weight of 200 was used as additive. The additive was mixed with appropriate amounts of water to impregnate the catalysts by way of pore volume impregnation. The catalysts were presulfided and tested in the manner described in Example 1. Catalyst composition and test results are summarised in Table 4.

TABLE 4

| Catalyst | Additive (mole/mole) | Drying T (° C.) | Drying t (hr) | Calcining T (° C.) | Calcining t (hr) | X-ray | Activity A | Activity B |
|---|---|---|---|---|---|---|---|---|
| AC1 | 0.05 | 100 | 16 | – | – | + | 166 | 168 |
| AC2 | 0.25 | 100 | 16 | – | – | + | 164 | 165 |
| AC3 | 1.00 | 100 | 16 | – | – | + | 161 | 168 |
| A(C) | – | – | – | – | – | – | 100 | 126 |
| A1(C) | 0 | 100 | 16 | – | – | + | 98 | 122 |
| A3(C) | – | – | – | – | – | – | 123 | 127 |
| AC1(C) | 0.25 | 100 | 16 | 500 | 4 | – | 102 | 130 |
| AC2(C) | 3.00 | 100 | 16 | – | – | + | 93 | 123 |
| AC3(C) | 0.25 | 300 | 16 | – | – | + | 105 | 127 |

Again, the catalysts according to the invention show a much higher activity than the comparative catalysts in the hydrodesulphurisation of both Feed A and Feed B.

Example 4

Preparation of a Hydrodesulphurisation Catalyst Using Diethylene Glycol

Example 1 was repeated, except that diethylene glycol was used as additive. The additive was mixed with appropriate amounts of water to impregnate the catalysts by way of pore volume impregnation. The catalysts were presulfided and tested in the manner described in Example 1. Catalyst composition and test results are summarised in Table 5.

TABLE 5

| Catalyst | Additive (mole/mole) | Drying T (° C.) | Drying t (hr) | Calcining T (° C.) | Calcining t (hr) | X-ray | Activity A | Activity B |
|---|---|---|---|---|---|---|---|---|
| AD1 | 0.05 | 100 | 16 | – | – | + | 174 | 178 |
| AD2 | 0.25 | 100 | 16 | – | – | + | 174 | 184 |
| AD3 | 1.00 | 100 | 16 | – | – | + | 173 | 175 |
| A(C) | – | – | – | – | – | – | 100 | 126 |
| A1(C) | 0 | 100 | 16 | – | – | + | 98 | 122 |
| A3(C) | – | – | – | – | – | – | 123 | 127 |
| AD1(C) | 0.25 | 100 | 16 | 500 | 4 | – | 103 | 130 |
| AD2(C) | 3.00 | 100 | 16 | – | – | + | 100 | 129 |
| AD3(C) | 0.25 | 300 | 16 | – | – | + | 108 | 128 |

Again, the catalysts according to the invention show a much higher activity than the comparative catalysts in the hydrodesulphurisation of both Feed A and Feed B.

Example 5

Preparation of a Hydrodesulphurisation Catalyst Using Polyethylene Glycol (MW400)

Example 1 was repeated, except that a polyethylene glycol with an average molecular weight of 400 was used as additive. The additive was mixed with appropriate amounts of water to impregnate the catalysts by way of pore volume impregnation. The catalysts were presulfided and tested in the manner described in Example 1. Catalyst composition and test results are summarised in Table 6.

TABLE 6

| Catalyst | Additive (mole/mole) | Drying T (° C.) | Drying t (hr) | Calcining T (° C.) | Calcining t (hr) | X-ray | Activity A | Activity B |
|---|---|---|---|---|---|---|---|---|
| AE1 | 0.05 | 100 | 16 | – | – | + | 154 | 158 |
| AE2 | 0.25 | 100 | 16 | – | – | + | 149 | 156 |
| AE3 | 1.00 | 100 | 16 | – | – | + | 151 | 155 |
| A(C) | – | – | – | – | – | – | 100 | 126 |
| A1(C) | 0 | 100 | 16 | – | – | + | 98 | 122 |
| A3(C) | – | – | – | – | – | – | 123 | 127 |
| AE1(C) | 0.25 | 100 | 16 | 500 | 4 | – | 100 | 125 |
| AE2(C) | 3.00 | 100 | 16 | – | – | + | 89 | 119 |
| AE3(C) | 0.25 | 300 | 16 | – | – | + | 103 | 123 |

Again, the catalysts according to the invention show a much higher activity than the comparative catalysts in the hydrodesulphurisation of both Feed A and Feed B.

Example 6

Preparation of a Hydrodesulphurisation Catalyst Using Tri Methylol Ethane

Example 1 was repeated, except that trimethylol ethane was used as additive. The additive was mixed with appropriate amounts of water to impregnate the catalysts by way of pore volume impregnation. The catalysts were presulfided and tested in the manner described in Example 1. Catalyst composition and test results are summarised in Table 7.

TABLE 7

| Catalyst | Additive (mole/mole) | Drying T (° C.) | Drying t (hr) | Calcining T (° C.) | Calcining t (hr) | X-ray | Activity A | Activity B |
|---|---|---|---|---|---|---|---|---|
| AF1 | 0.05 | 100 | 16 | – | – | + | 146 | 149 |
| AF2 | 0.25 | 100 | 16 | – | – | + | 148 | 149 |
| AF3 | 1.00 | 100 | 16 | – | – | + | 143 | 145 |
| A(C) | – | – | – | – | – | – | 100 | 126 |
| A1(C) | 0 | 100 | 16 | – | – | + | 98 | 122 |
| A3(C) | – | – | – | – | – | – | 123 | 127 |
| AF1(C) | 0.25 | 100 | 16 | 500 | 4 | – | 97 | 126 |
| AF2(C) | 3.00 | 100 | 16 | – | – | + | 88 | 120 |
| AF3(C) | 0.25 | 300 | 16 | – | – | + | 103 | 126 |

Again, the catalysts according to the invention show a much higher activity than the comparative catalysts in the hydrodesulphurisation of both Feed A and Feed B. Example 7

Preparation of a Hydrodesulphurisation Catalyst Using Glucose

Example 1 was repeated, except that glucose was used as additive. The additive was mixed with appropriate amounts of water to impregnate the catalysts by way of pore volume impregnation. The catalysts were presulfided and tested in the manner described in Example 1. Catalyst composition and test results are summarised in Table 8.

TABLE 8

| | | Drying | | Calcining | | | Activity | |
|---|---|---|---|---|---|---|---|---|
| Catalyst | Additive (mole/mole) | T (° C.) | t (hr) | T (° C.) | t (hr) | X-ray | A | B |
| AG1 | 0.05 | 100 | 16 | – | – | + | 142 | 148 |
| AG2 | 0.25 | 100 | 16 | – | – | + | 148 | 146 |
| AG3 | 1.00 | 100 | 16 | – | – | + | 141 | 145 |
| A(C) | – | – | – | – | – | – | 100 | 126 |
| A1(C) | 0 | 100 | 16 | – | – | + | 98 | 122 |
| A3(C) | – | – | – | – | – | – | 123 | 121 |
| AG1(C) | 0.25 | 100 | 16 | 500 | 4 | – | 100 | 125 |
| AG2(C) | 3.00 | 100 | 16 | – | – | + | 79 | 111 |
| AG3(C) | 0.25 | 300 | 16 | – | – | + | 105 | 124 |

Again, the catalysts according to the invention show a much higher activity than the comparative catalysts in the hydrodesulphurisation of both Feed A and Feed B.

Example 8

Preparation of a Hydrodenitrogenation Catalyst Using Ethylene Glycol

Comparative catalyst B, which is to be used as starting material for hydrodenitrogenation catalysts, is prepared as follows. One kilogram of gamma-alumina extrudates is impregnated with an aqueous impregnation solution containing suitable amounts of molybdenum trioxide, nickel carbonate, and phosphoric acid. The impregnated extrudates are dried for 16 hours at 100° C., after which the dried extrudates are calcined for four hours at 500° C. in air. The thus obtained catalyst contained 18 wt. % of molybdenum, calculated as trioxide, 4 wt. % of nickel, calculated as oxide, and 6 wt. % of phosphorus, calculated as $P_2O_5$.

Various catalysts according to the invention were prepared by impregnating Comparative catalyst B to pore volume saturation with an impregnation solution comprising an appropriate amount of ethylene glycol mixed in water, to obtain the amount of ethylene glycol in the catalyst composition given in Table 9. The catalysts were then dried under the conditions given in Table 9.

The starting Comparative catalyst B is indicated as B(C). Comparative catalyst B1 (C) was prepared by impregnating Comparative catalyst B to pore volume saturation with water, and then drying the resulting product for 16 hours at 100√ C. Comparative catalyst B2(C) was prepared by sulfiding Comparative catalyst with TNPS, as is described in Japanese patent publication No. H-4 79701.

Comparative catalyst BA1(C) was prepared by subjecting a catalyst with the same composition as Catalyst BA2 to a calcination step. Comparative catalyst BA2(C) was prepared by a process in which a too large amount of additive was used as compared with the amount of metal present. The presence of a too large amount of additive will cause plugging of the catalyst pores with additive, detrimentally affecting activity. Comparative catalyst BA3(C) was prepared by a process in which the catalyst is dried at a temperature which is so high that at least part of the additive decomposes or evaporates.

To be tested, 15 ml of each catalyst was brought into a continuous reactor and tested using the feed types also applied in the hydrodesulphurisation experiments described before. The catalysts were presulfided and used under the same conditions as applied for the hydrodesulphurisation experiments described before. Reference is made to Table 1 in Example 1.

The reaction velocity was calculated from the quantity of nitrogen in the product in relation to the quantity of nitrogen in the feed. The quantity of nitrogen was determined using a TN-5 nitrogen analyser of Misubisi Kasei. The velocity constant was calculated using the pseudolinear formula 2, in which $NO\mu$ stands for the amount of nitrogen present in the feed, while N stands for the amount of nitrogen present in the product.

$$k_n = LHSV \times 1n(N_0 N)$$

The activity of comparative catalyst B is set at 100, and the values found for the other catalysts are recalculated in relation to this value. The results obtained for the various catalysts in the hydrodenitrogenation of both Feed A and Feed B are given in Table 9.

TABLE 9

| | | Drying | | Calcining | | | Activity | |
|---|---|---|---|---|---|---|---|---|
| Catalyst | Additive (mole/mole) | T (° C.) | t (hr) | T (° C.) | t (hr) | X-ray | A | B |
| BA1 | 0.05 | 100 | 16 | – | – | + | 174 | 179 |
| BA2 | 0.25 | 100 | 16 | – | – | + | 178 | 182 |
| BA3 | 1.00 | 100 | 16 | – | – | + | 181 | 180 |
| B(C) | – | – | – | – | – | – | 100 | 148 |
| B1(C) | 0 | 100 | 16 | – | – | + | 97 | 154 |
| B2(C) | – | – | – | – | – | – | 150 | 149 |
| BA1(C) | 0.25 | 100 | 16 | 500 | 4 | – | 149 | 150 |
| BA2(C) | 3.00 | 100 | 16 | – | – | + | 114 | 148 |
| BA3(C) | 0.25 | 300 | 16 | – | – | + | 98 | 146 |

From the values given in Table 9 it is clear that the catalysts according to the invention show a much higher activity for the hydrodenitrogenation of both Feed A and Feed B than the comparative catalysts. This goes for the comparative catalysts which were prepared without the use of an additive as well as for the catalysts which were prepared using an additive but in which the additive was either removed by calcination (BA1 (C)), or in which too much additive was used (BA2(C)), or in which the additive was removed by drying at a too high temperature (BA3(C)).

Example 9

Preparation of a Hydrodenitrogenation Catalyst Using Diethylene Glycol Monoethyl Ether Example 8 was repeated, except that diethylene glycol monoethyl ether was used as additive. The additive was mixed with appropriate amounts of water to impregnate the catalysts by way of pore volume impregnation. The catalysts were presulfided and tested in the manner described in Example 8. Catalyst composition and test results are summarised in Table 10.

TABLE 10

| | | Drying | | Calcining | | | Activity | |
|---|---|---|---|---|---|---|---|---|
| Catalyst | Additive (mole/mole) | T (° C.) | t (hr) | T (° C.) | t (hr) | X-ray | A | B |
| BB1 | 0.05 | 100 | 16 | – | – | + | 192 | 194 |
| BB2 | 0.25 | 100 | 16 | – | – | + | 190 | 189 |
| BB3 | 1.00 | 100 | 16 | – | – | + | 193 | 192 |
| B(C) | – | – | – | – | – | – | 100 | 148 |

TABLE 10-continued

| Catalyst | Additive (mole/mole) | Drying T (° C.) | Drying t (hr) | Calcining T (° C.) | Calcining t (hr) | X-ray | Activity A | Activity B |
|---|---|---|---|---|---|---|---|---|
| B1(C) | 0 | 100 | 16 | – | – | + | 112 | 154 |
| B3(C) | – | – | – | – | – | – | 148 | 150 |
| BB1(C) | 0.25 | 100 | 16 | 500 | 4 | – | 101 | 150 |
| BB2(C) | 3.00 | 100 | 16 | – | – | + | 114 | 143 |
| BB3(C) | 0.25 | 300 | 16 | – | – | + | 104 | 147 |

It is clear that the catalysts according to the invention show much higher activity in the hydrogenation of the two feeds than the comparative catalysts.

Example 10

Preparation of a Hydrodenitrogenation Catalyst Using Polyethylene Glycol (MW 200)

Example 8 was repeated, except that a polyethylene glycol with a molecular eight of 200 was used as additive. The additive was mixed with appropriate amounts of water to impregnate the catalysts by way of pore volume impregnation. The catalysts ere presulfided and tested in the manner described in Example 8. Catalyst composition and test results are summarised in Table 11.

TABLE 11

| Catalyst | Additive (mole/mole) | Drying T (° C.) | Drying t (hr) | Calcining T (° C.) | Calcining t (hr) | X-ray | Activity A | Activity B |
|---|---|---|---|---|---|---|---|---|
| BC1 | 0.05 | 100 | 16 | – | – | + | 177 | 181 |
| BC2 | 0.25 | 100 | 16 | – | – | + | 185 | 186 |
| BC3 | 1.00 | 100 | 16 | – | – | + | 186 | 188 |
| B(C) | – | – | – | – | – | – | 100 | 148 |
| B1(C) | 0 | 100 | 16 | – | – | + | 112 | 154 |
| B3(C) | – | – | – | – | – | – | 148 | 150 |
| BC1(C) | 0.25 | 100 | 16 | 500 | 4 | – | 98 | 145 |
| BC2(C) | 3.00 | 100 | 16 | – | – | + | 110 | 138 |
| BC3(C) | 0.25 | 300 | 16 | – | – | + | 98 | 143 |

It is clear that the catalysts according to the invention show much higher activity in the hydrogenation of the two feeds than the comparative catalysts.

Example 11

Preparation of a Hydrodenitrogenation Catalyst Using Diethylene Glycol

Example 8 was repeated, except that diethylene glycol was used as additive. The additive was mixed with appropriate amounts of water to impregnate the catalysts by way of pore volume impregnation. The catalysts were presulfided and tested in the manner described in Example 8. Catalyst composition and test results are summarised in Table 12.

TABLE 12

| Catalyst | Additive (mole/mole) | Drying T (° C.) | Drying t (hr) | Calcining T (° C.) | Calcining t (hr) | X-ray | Activity A | Activity B |
|---|---|---|---|---|---|---|---|---|
| BD1 | 0.05 | 100 | 16 | – | – | + | 201 | 205 |
| BD2 | 0.25 | 100 | 16 | – | – | + | 205 | 208 |
| BD3 | 1.00 | 100 | 16 | – | – | + | 201 | 203 |
| B(C) | – | – | – | – | – | – | 100 | 148 |
| B1(C) | 0 | 100 | 16 | – | – | + | 112 | 154 |
| B3(C) | – | – | – | – | – | – | 148 | 150 |
| BD1(C) | 0.25 | 100 | 16 | 500 | 4 | – | 102 | 151 |
| BD2(C) | 3.00 | 100 | 16 | – | – | + | 128 | 153 |
| BD3(C) | 0.25 | 300 | 16 | – | – | + | 107 | 149 |

It is clear that the catalysts according to the invention show much higher activity in the hydrogenation of the two feeds than the comparative catalysts.

Example 12

Preparation of a Hydrodenitrogenation Catalyst Using Polyethylene Glycol (MW 400)

Example 8 was repeated, except that a polyethylene glycol with an average molecular weight of 400 was used as additive. The additive was mixed with appropriate amounts of water to impregnate the catalysts by way of pore volume impregnation. The catalysts were presulfided and tested in the manner described in Example 8. Catalyst composition and test results are summarised in Table 13.

TABLE 13

| Catalyst | Additive (mole/mole) | Drying T (° C.) | Drying t (hr) | Calcining T (° C.) | Calcining t (hr) | X-ray | Activity A | Activity B |
|---|---|---|---|---|---|---|---|---|
| BE1 | 0.05 | 100 | 16 | – | – | + | 184 | 188 |
| BE2 | 0.25 | 100 | 16 | – | – | + | 190 | 192 |
| BE3 | 1.00 | 100 | 16 | – | – | + | 186 | 190 |
| B(b) | — | – | – | – | – | – | 100 | 148 |
| B1(C) | 0 | 100 | 16 | – | – | + | 112 | 154 |
| B3(C) | – | – | – | – | – | – | 148 | 150 |
| BE1(C) | 0.25 | 100 | 16 | 500 | 4 | – | 100 | 145 |
| BE2(C) | 3.00 | 100 | 16 | – | – | + | 121 | 152 |
| BE3(C) | 0.25 | 300 | 16 | – | – | + | 104 | 147 |

It is clear that the catalysts according to the invention show much higher activity in the hydrogenation of the two feeds than the comparative catalysts.

Example 13

Preparation of a Hydrodenitrogenation Catalyst Using Trimethylol Ethane

Example 8 was repeated, except that trimethylol ethane was used as additive. The additive was mixed with appropriate amounts of water to impregnate the catalysts by way of pore volume impregnation. The catalysts were presulfided and tested in the manner described in Example 8. Catalyst composition and test results are summarised in Table 14.

TABLE 14

| Catalyst | Additive (mole/mole) | Drying T (° C.) | Drying t (hr) | Calcining T (° C.) | Calcining t (hr) | X-ray | Activity A | Activity B |
|---|---|---|---|---|---|---|---|---|
| BF1 | 0.05 | 100 | 16 | – | – | + | 170 | 172 |
| BF2 | 0.25 | 100 | 16 | – | – | + | 175 | 176 |
| BF3 | 1.00 | 100 | 16 | – | – | + | 177 | 181 |
| B(C) | – | – | – | – | – | – | 100 | 148 |
| B1(C) | 0 | 100 | 16 | – | – | + | 112 | 154 |
| B3(C) | – | – | – | – | – | – | 148 | 150 |
| BF1(C) | 0.25 | 100 | 16 | 500 | 4 | – | 100 | 150 |
| BF2(C) | 3.00 | 100 | 16 | – | – | + | 94 | 143 |
| BF3(C) | 0.25 | 300 | 16 | – | – | + | 99 | 149 |

Again, the catalysts according to the invention show much higher activity in the hydrogenation of the two feeds than the comparative catalysts.

Example 14

Preparation of a Hydrodenitrogenation Catalyst Using Glucose

Example 8 was repeated, except that glucose was used as additive. The additive was mixed with appropriate amounts of water to impregnate the catalysts by way of pore volume impregnation. The catalysts were presulfided and tested in the manner described in Example 8. Catalyst composition and test results are summarised in Table 15.

TABLE 15

| Catalyst | Additive (mole/mole) | Drying T (° C.) | Drying t (hr) | Calcining T (° C.) | Calcining t (hr) | X-ray | Activity A | Activity B |
|---|---|---|---|---|---|---|---|---|
| BG1 | 0.05 | 100 | 16 | – | – | + | 169 | 171 |
| BG2 | 0.25 | 100 | 16 | – | – | + | 165 | 169 |
| BG3 | 1.00 | 100 | 16 | – | – | + | 165 | 167 |
| B(C) | – | – | – | – | – | – | 100 | 148 |
| B1(C) | 0 | 100 | 16 | – | – | + | 112 | 154 |
| B3(C) | – | – | – | – | – | + | 148 | 150 |
| BG1(G) | 0.25 | 100 | 16 | 500 | 4 | – | 97 | 149 |
| BG2(C) | 3.00 | 100 | 16 | – | – | + | 98 | 141 |
| BG3(C) | 0.25 | 300 | 16 | – | – | + | 96 | 145 |

It is clear that the catalysts according to the invention show much higher activity in the hydrogenation of the two feeds than the comparative catalysts.

Example 15

To ascertain the precise composition of the catalyst of aforementioned Japanese Laid-Open 1995-136523, Example 1 of that reference was replicated in accordance with the following procedure:

One hundred and fifty grams of a gamma-alumina carrier with a surface area of 228 m2/g was impregnated with an impregnation solution comprising 29.39 grams of molybdenum trioxide, 13.07 grams of cobalt carbonate, 14.55 grams of 80% phosphoric acid, and 30 grams of citric acid. The impregnation was carried out at room temperature in a rotating vessel. The product was dried for 20 hours at a temperature of 130C and subsequently heated for 2 hours in air at a product temperature of about 245° C. in a rotating vessel.

The resulting product had an LOI (loss on ignition, 600° C.) of 7.2 wt. %. Of this, about 5.5 wt. % can be attributed to citric acid. This corresponded with the catalyst containing 0.055 mole of citric acid. The catalyst contained 0.20 mole of molybdenum trioxide.

In catalysts containing molybdenum and citrate, the citrate and molybdenum will combine to form $Mo_4O_{11}(cit)_2^{4-}$. Thus, 0.11 mole, or 55%, of the molybdenum is complexed by citric acid.

The resulting product was in marked contradistinction to the conventional hydrotreating catalyst required by the present invention in which the hydrogenation metals are substantially in the oxide form.

What is claimed is:

1. A process for activating a conventional hydrotreating catalyst comprising hydrogenation metal components on a carrier comprising one or more Group VIII hydrogenation metals substantially in the oxide form and one or more Group VI hydrogenation metals substantially in the oxide form in which the hydrotreating catalyst is contacted with an additive which is at least one compound selected from the group of compounds comprising at least two hydroxyl groups and 2–10 carbon atoms, and the ethers and polyethers of these compounds, after which the catalyst is dried under such conditions that at least 50% of the additive remains in the catalyst.

2. The process of claim 1 wherein the additive is at least one compound selected from ethylene glycol, diethylene glycol, and polyethylene glycol.

3. The process of claim 1 wherein the additive is a saccharide or a polysaccharide.

4. The process of claim 1 wherein the mole ratio between the amount of additive and the amount of hydrogenation metals is 0.01:1 to 2.5:1.

5. The process of claim 1 wherein the hydrotreating catalyst to be activated is a fresh hydrotreating catalyst.

6. The process of claim 1 wherein the hydrotreating catalyst to be activated is a used hydrotreating catalyst which has been regenerated.

7. The process of claim 1 wherein the hydrotreating catalyst to be activated comprises a molybdenum oxide compound, an oxide compound of nickel or cobalt, and a phosphorus oxide compound on a carrier comprising gamma-alumina.

8. A hydrotreating catalyst prepared in accordance with the process of claim 1 which comprises one or more Group VIII hydrogenation metals substantially in the oxide form and one or more Group VI hydrogenation metals substantially in the oxide form which catalyst additionally comprises an additive which is at least one compound selected from the group of compounds comprising at least two hydroxyl groups and 2–10 carbon atoms, and the ethers and polyethers of these compounds.

9. The hydrotreating catalyst of claim 8, which shows a peak in its X-ray diffraction pattern at $2\Theta=6-8°$.

10. A process for hydrotreating a hydrocarbon feed in which a hydrocarbon feed is contacted under hydrotreating conditions with a catalyst according to claim 8, which optionally has been presulfided or sulfided before it is contacted with the hydrocarbon feed.

11. A process for hydrotreating a hydrocarbon feed wherein a hydrocarbon feed containing at least 0.2 wt. % of S is contacted with a catalyst according to claim 8 under hydrotreating conditions.

12. A hydrotreating catalyst which comprises hydrogenation metal components on a carrier comprising one or more Group VIII hydrogenation metal compounds and one or more Group VI hydrogenation metal compounds, wherein the catalyst is a conventional hydrotreating catalyst that additionally comprises an additive which is at least one compound selected from the group of compounds comprising at least two hydroxyl groups and 2–10 carbon atoms, and the ethers and polyethers of these compounds, wherein the additive is incorporated into the catalyst when said one or more Group VIII hydrogenation metal compounds and said one or more Group VI hydrogenation metal compounds are substantially in the oxide form.

13. The hydrotreating catalyst of claim 12, which shows a peak in its X-ray diffraction pattern at $2\Theta=6-8°$.

* * * * *